United States Patent [19]

Arbie, Sr.

[11] 4,401,276
[45] Aug. 30, 1983

[54] METHOD FOR DEAGGLOMERATING SINTERED PHOSPHORS

[75] Inventor: John A. Arbie, Sr., Bradford, Pa.

[73] Assignee: GTE Products Corporation, Stamford, Conn.

[21] Appl. No.: 322,033

[22] Filed: Nov. 16, 1981

[51] Int. Cl.³ ............................................. B02C 19/12
[52] U.S. Cl. ........................................ 241/29; 241/159; 252/301.4 P
[58] Field of Search ................... 252/301.4 P, 301.6 P; 427/67; 241/18, 27, 29, 30, 152 A, 159

[56] References Cited

U.S. PATENT DOCUMENTS

| | | | |
|---|---|---|---|
| 2,987,414 | 6/1961 | Martyny | 427/67 |
| 3,167,261 | 1/1965 | Wonneberger | 241/159 |
| 3,504,621 | 4/1970 | Qualheim | 241/159 X |
| 3,806,046 | 4/1974 | Kouloheris et al. | 241/29 X |
| 3,940,343 | 2/1976 | Demarest et al. | 252/301.4 P |

FOREIGN PATENT DOCUMENTS 59266 3/1970 Poland ................................. 241/29

Primary Examiner—Mark Rosenbaum
Attorney, Agent, or Firm—J. Theodosopoulos

[57] ABSTRACT

Sintered phosphor chunks are deagglomerated by feeding the chunks into a crushing machine to break them into pieces small enough to be vacuum-transported to a vacuum tank from which they drop into a controlled device which distributes the phosphor pieces into a uniform flow. The pieces are then uniformly fed into a roll crusher having an upper pair and a lower pair of rolls, which crush the phosphor into pieces small enough for use in preparing phosphor coating suspensions.

5 Claims, 1 Drawing Figure

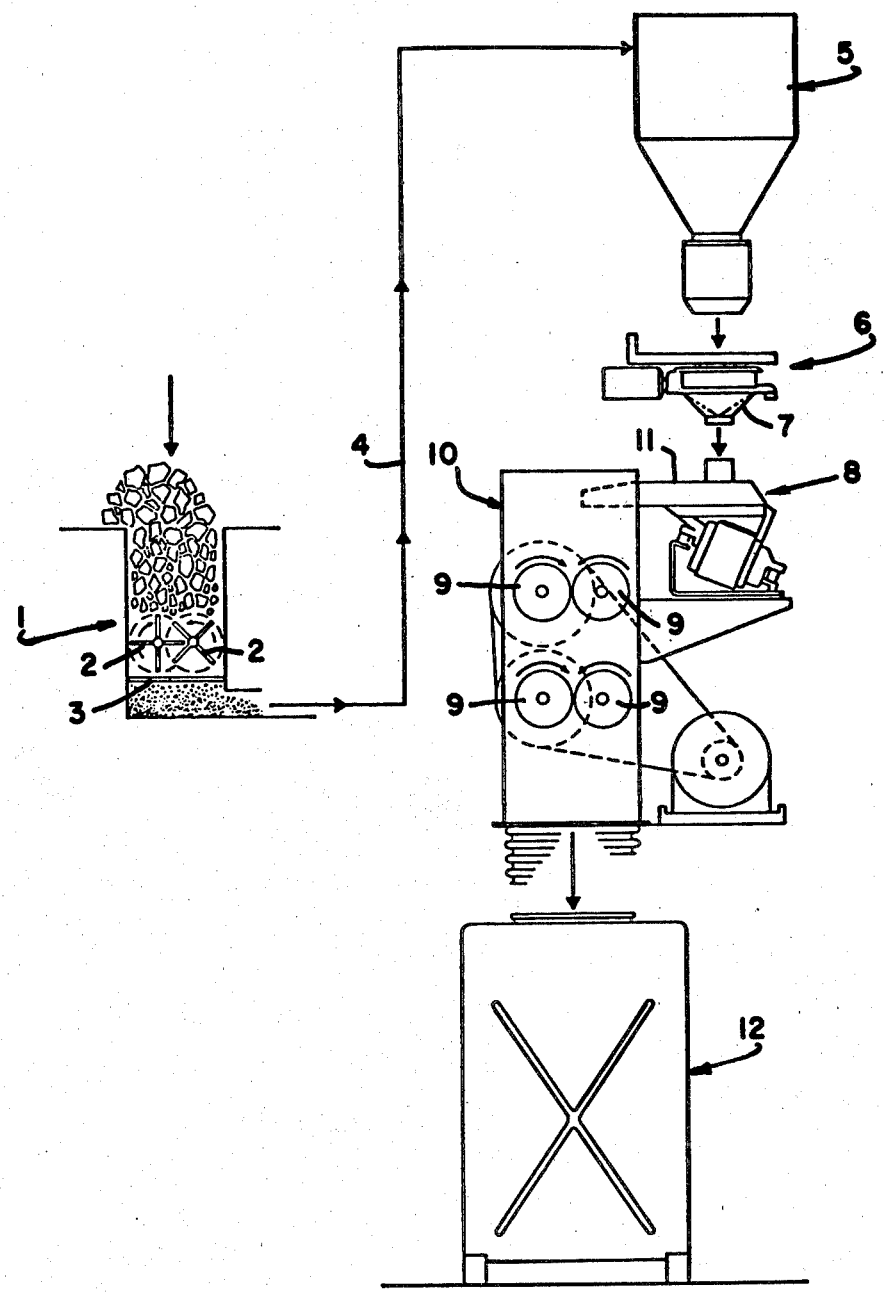

METHOD FOR DEAGGLOMERATING SINTERED PHOSPHORS

Phosphors are generally made by blending raw materials and then firing the blend at a high temperature to combine the raw materials to form the phosphor. In the case of fluorescent lamp phosphors, for example, halophosphates, the firing is generally at temperatures above about 1000° C. The fired phosphor cake is generally lumpy and must be deagglomerated before it can be mixed into suitable phosphor-coating suspensions. Previous methods for deagglomerating the phosphor were hammer-milling, pebble-milling, attrition-milling, ball-milling and stirring, as disclosed in U.S. Pat. Nos. 2,987,414, 3,023,339, 3,470,106, 3,639,253, 3,919,109 and 3,940,343. Such deagglomeration methods are generally batch processes.

This invention, in contrast, is concerned with an improved method for deagglomerating phosphors, which is a semi-continuous process.

The drawing is a schematic of apparatus for practicing one embodiment of the invention.

As previously mentioned, phosphor raw materials are blended together, and the phosphor blend is then loaded into suitable trays for firing in a furnace. After firing, the phosphor cakes are removed from the trays and then broken by hand into chunks. In accordance with this invention, the phosphor chunks are then fed into a crushing machine 1, for example, a Jacobson Finger Crusher, and are broken into pieces small enough to be transported through a pipe to the next step in the process. In one example, the phosphor cakes measured about 4"×10" and, because they were quite frangible, were easily broken by hand into chunks small enough to be fed into crushing machine 1, say, pieces less than about 4" across. Rotating fingers 2 of crushing machine 1 crushed the pieces sufficiently to pass thru the ½" holes of screen 3 below. In order to minimize abrasive contamination of the phosphor, fingers 2 were made of stainless steel and were hard chrome plated.

The phosphor pieces were then transported to a solid flow control device and then to a feeding device which distributed the phosphor pieces uniformly to a roll crusher.

In said example, the transport mechanism was a high volume, pump-induced vacuum transport system, which transported the phosphor pieces through a two inch glass pipe 4 to a vacuum tank 5. The glass permitted observation of the phosphor therewithin. The vacuum transport imparted a beneficial cooling effect to the phosphor which enhanced fracturing of the agglomerates. The vacuum tank was about four cubic feet in capacity and was lined with silicone rubber in order to reduce metallic contamination. A canvas filter in the vacuum tank prevented the phosphor from being drawn into the vacuum pump (not shown).

From the vacuum tank the phosphor dropped, generally in clumps, into a solid flow control device 6 which separated and distributed the phosphor pieces into a uniform flow. In said example, solid flow control device 6 was a Siletta vibratory feeder, which contained a slotted tray into which the phosphor dropped from the vacuum tank. The tray was vibrated with a straight line reciprocating motion of low amplitude, with the phosphor dropping through the slots of the tray to a discharge funnel 7 below. The tray as well as other parts of the Siletta were coated with abrasion resistant nylon to reduce metallic contamination of the phosphor.

Next, the phosphor dropped into a feeder 8 the purpose of which was to distribute the phosphor uniformly along the length of rolls 9 of a roller mill 10 below. In said example, feeder 8 was an Eriez vibrating feeder, which comprised a flat bottom tray 11, tilted slightly from the horizontal, narrow at its receiving end and widening to the dimension of the roll length below at its discharge end. Feeder 8 was also coated with abrasion resistant nylon. The discharge end of feeder 8 was directly above the gap between a pair of parallel, slightly spaced apart rolls 9 of roller mill 10, so that the phosphor was uniformly distributed along the length of rolls 9. A second pair of rolls 9, closer together, was located directly below the first pair, to crush the phosphor further. In said example, roll crusher 10 was a Sprout-Waldron, rolls 9 of which were nine inches diameter by eighteen inches long. The gaps between the upper pair and lower pair rolls 9 were seventy mils and thirty mils, respectively. Rolls 9 were coated with a tungsten carbide composite in order to provide the correct amount of crushing without damaging the individual phosphor crystals and without contaminating the phosphor. Parts of roller mill 10 were coated with polyurethane to prevent metallic contamination.

From roller mill 10, the phosphor was collected in a suitable container 12. All the phosphor from roller mill 10 will pass through a twenty mesh screen size. The deagglomerated phosphor can then be used to prepare the usual phosphor coating suspensions, but with additional deagglomeration, in order to obtain the desired ultimate particle size, say, five to thirty microns. An example of said additional deagglomeration and coating suspension preparation is shown in copending application Ser. No. 270,290, filed June 4, 1981, same assignee.

Fluorescent lamps made with halophosphate phosphors that were deagglomerated in accordance with this invention had higher and more consistent levels of brightness, and at the same time required less phosphor powder weight per lamp, about 0.2 to 0.3 grams less.

I claim:

1. A method of deagglomerating sintered phosphors comprising the steps of: feeding chunks of the sintered phosphors into a crushing machine to break the chunks into pieces small enough to be vacuum-transported; vacuum-transporting said pieces to a vacuum tank; permitting said pieces to drop from the vacuum tank into a solid flow control device, for separating and distributing the phosphor pieces into a uniform flow; permitting said pieces to uniformly flow into a feeder having a discharge end which is disposed directly above a first pair of parallel, slightly spaced apart rolls of a roll crusher; crushing said phosphor pieces between said first pair of rolls; and further crushing said phosphor pieces between a second pair of parallel, slightly spaced apart rolls of said roll crusher, said second pair being disposed directly below said first pair and having a smaller gap than the gap between said first pair.

2. The method of claim 1 wherein said crushing machine is a finger crusher having hard chrome plated stainless steel fingers.

3. The method of claim 1 wherein the phosphor pieces are vacuum-transported to the vacuum tank through a glass pipe in order to permit observation of the phosphor therewithin.

4. The method of claim 1 wherein said solid flow control device is a vibratory feeder which vibrates with a straight line reciprocating motion of low amplitude.

5. The method of claim 1 wherein the rolls of said roll crusher are coated with a tungsten carbide composite.

* * * * *